United States Patent
Malnati et al.

(10) Patent No.: US 9,942,110 B2
(45) Date of Patent: Apr. 10, 2018

(54) VIRTUAL TAPE LIBRARY (VTL) MONITORING SYSTEM

(71) Applicants: James R Malnati, Stillwater, MN (US); Robert J Jamieson, Kuala Lumpur (MY)

(72) Inventors: James R Malnati, Stillwater, MN (US); Robert J Jamieson, Kuala Lumpur (MY)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 14/314,066

(22) Filed: Jun. 25, 2014

(65) Prior Publication Data

US 2015/0381439 A1  Dec. 31, 2015

(51) Int. Cl.
G06F 15/16 (2006.01)
H04L 12/26 (2006.01)
H04L 12/24 (2006.01)

(52) U.S. Cl.
CPC .............. *H04L 43/04* (2013.01); *H04L 41/28* (2013.01); *H04L 41/06* (2013.01)

(58) Field of Classification Search
CPC .......... H04L 41/06; H04L 41/28; H04L 43/04
USPC ................................. 709/203–230
See application file for complete search history.

(56) References Cited

U.S. PATENT DOCUMENTS

| | | | |
|---|---|---|---|
| 8,832,654 B2* | 9/2014 | Malnati ............... | H04L 41/0681 717/101 |
| 9,274,724 B1* | 3/2016 | Wang .................... | G06F 3/0665 |
| 2009/0077097 A1* | 3/2009 | Lacapra ................ | G06F 17/302 |
| 2010/0031080 A1* | 2/2010 | Shangguan ......... | G06F 11/1456 714/6.12 |
| 2011/0022718 A1* | 1/2011 | Evans ................... | G06F 3/0608 709/231 |
| 2012/0284559 A1* | 11/2012 | Akirav ................ | G06F 11/1456 714/6.2 |
| 2013/0019180 A1* | 1/2013 | Kimbuende ............ | H04L 43/04 715/736 |
| 2013/0159648 A1* | 6/2013 | Anglin ................ | G06F 11/1453 711/162 |
| 2013/0326159 A1* | 12/2013 | Vijayan ................ | G06F 3/0644 711/148 |
| 2014/0136892 A1* | 5/2014 | Wu ........................ | G06F 3/061 714/15 |
| 2015/0081893 A1* | 3/2015 | Chadwell .............. | G06F 3/0659 709/224 |

* cited by examiner

Primary Examiner — Moustafa M Meky
Assistant Examiner — Thorne E Waugh

(57) ABSTRACT

Monitoring of storage systems, including virtual tape libraries (VTLs), may be performed with automated systems. Automated monitoring may be performed through an SSH connection to a storage manager for the storage system. For example, a method may include initiating, by a monitoring server, an SSH connection to a storage manager; issuing commands, by the monitoring server, through the SSH connection to monitor a storage device coupled to the storage manager; receiving, by the monitoring server, responses to the issued commands through the SSH connection; matching, by the monitoring server, the responses to automation rules; and executing, by the monitoring server, commands based on the matched automation rules.

18 Claims, 5 Drawing Sheets

VIRTUAL TAPE LIBRARY (VTL) MONITORING SYSTEM

FIELD OF THE DISCLOSURE

The instant disclosure relates to backup systems. More specifically, this disclosure relates to monitoring backup systems.

BACKGROUND

Databases are used to store a variety of information. For example, databases may track financial transactions, errors occurring in a computer system, and changes to a document file. These databases are often essential to the operation of a company. Thus, the databases must save information, such that the information is quickly accessible on demand. Further, the databases must be fault-tolerant to prevent unnecessary downtime of the company. Virtual tape libraries (VTLs) are one storage device capable of storing these large databases.

Virtual tape library (VTL) solutions are advantageous over physical, sequential-access tape storage technologies. A VTL presents random-access mass storage to large computing systems, as if they were physical tape devices and media. They are generally attached through existing host operating system interfaces. They may be treated as normal tape volumes, and therefore require no operating system-level changes, because these tape volumes and drives are emulated instances of real media/tape devices. VTLs also reduce operator intervention, as no tape volumes need be manually located and mounted before they may be used.

However, despite all these advantages, VTLs do introduce monitoring requirements beyond those presented by physical tape devices and media. That is because the VTL server is a computing system, and is accompanied by the similar complexities and failure points of a computing system. A separate VTL Library Controller is also required in some implementations.

Complex systems, such as a VTL, require system- and network-level monitoring when companies come to rely on them for crucial business functions. A system operator, or often a team of shift workers, constantly monitors VTL operations directly, either by submitting VTL status commands or by watching separate monitoring tools. This is a highly manual and expensive approach to system monitoring, as a paid employee must be constantly deployed to sustain 24-hour vigilance. Further, this manual method does not scale well, as few individuals may monitor more than a handful of VTL systems without suffering productivity degradation. Many businesses may implement not one VTL, but many, as replication and resiliency are required for such a crucial subsystem. This increases the monitoring requirements in an exponential fashion for large, complex organizations with remote Disaster Recovery (DR) sites.

SUMMARY

Monitoring of storage systems, including virtual tape libraries (VTLs), may be performed with automated systems. Automated monitoring may be performed through a secure shell (SSH) connection to a storage manager for the VTL system. Automated, integrated monitoring of storage systems, including VTL systems, may be inexpensive to implement, may have a small cost to scale up to many systems, and may provide continuous monitoring with little or no additional staffing.

According to one embodiment, a method may include initiating, by a monitoring server, an SSH connection to a storage manager; issuing commands, by the monitoring server, through the SSH connection to monitor a storage device coupled to the storage manager; receiving, by the monitoring server, responses to the issued commands through the SSH connection; matching, by the monitoring server, the responses to automation rules; and executing, by the monitoring server, commands based on the matched automation rules.

According to another embodiment, a computer program product may include a non-transitory computer readable medium comprising code to perform the steps of initiating an SSH connection to a storage manager; issuing commands through the SSH connection to monitor a storage device coupled to the storage manager; receiving responses to the issued commands through the SSH connection; matching the responses to automation rules; and executing commands based on the matched automation rules.

According to a further embodiment, an apparatus may include at least one processor coupled to a memory and a communications adaptor. The processor may be configured to execute the steps of initiating an SSH connection, through the communications adaptor, to a storage manager; issuing commands through the SSH connection to monitor a storage device coupled to the storage manager; receiving responses to the issued commands through the SSH connection; storing the received responses in the memory; reading automation rules from the memory; matching the received responses to automation rules; and executing commands based on the matched automation rules.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
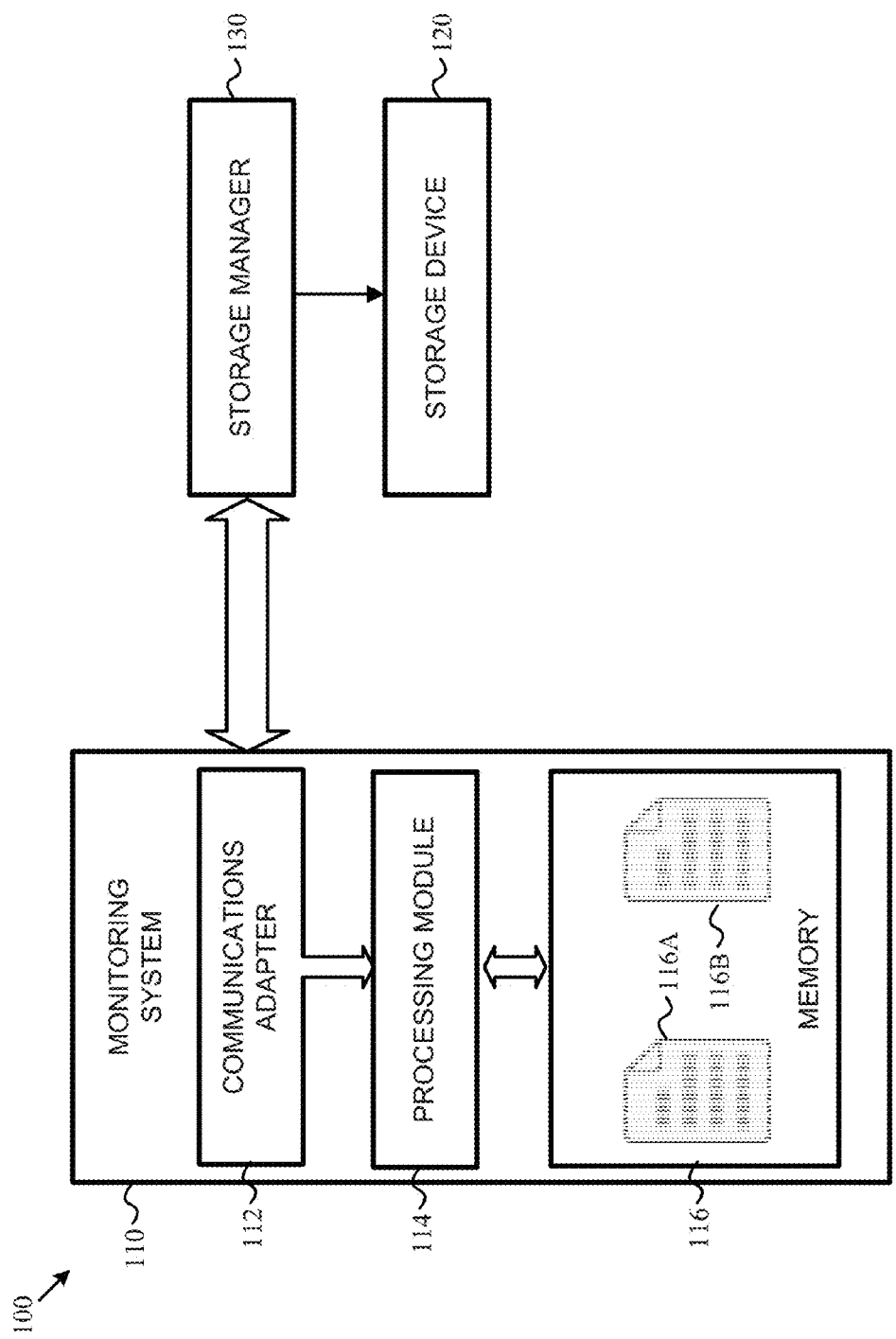
FIG. 1 is a block diagram illustrating a system for monitoring a storage device according to one embodiment of the disclosure.

FIG. 1 is a block diagram illustrating a system for monitoring a storage device according to one embodiment of the disclosure. A monitoring system 110 may include communications adapter 112 coupled to a storage device 120 for receiving information regarding operation of the storage device 120. The communications adapter 112 may receive information regarding the storage device 120 through a storage manager 130, which may be a separate system from the storage device 120. The communications adapter 112 may be a generic interface, such as a transmission control protocol/internet protocol (TCP/IP) connection over an Ethernet network interface card (NIC), to allow compatibility with many types of storage devices.

The monitoring system 110 may also include a processing module 114 coupled to the communications adapter 112 to receive obtained information regarding the storage device 120. The processing module 114 may store the obtained information 116A in memory 116. Also stored in memory 116 may be automation rules 116B for automating monitoring of the storage device 120. The processing module 114 may access the automation rules 116B and the obtained information 116A from memory 116 to determine if the obtained information 116A triggers any action defined by one of the automation rules 116B. For example, one of the automation rules 116B may specify a storage level threshold for triggering an alert. When data stored in the storage device 120 increases in size beyond the first storage level threshold, such as 85%, an alert may be triggered to email an administrator and inform them of the limited remaining storage capacity of the storage device 120.

Figure 2:
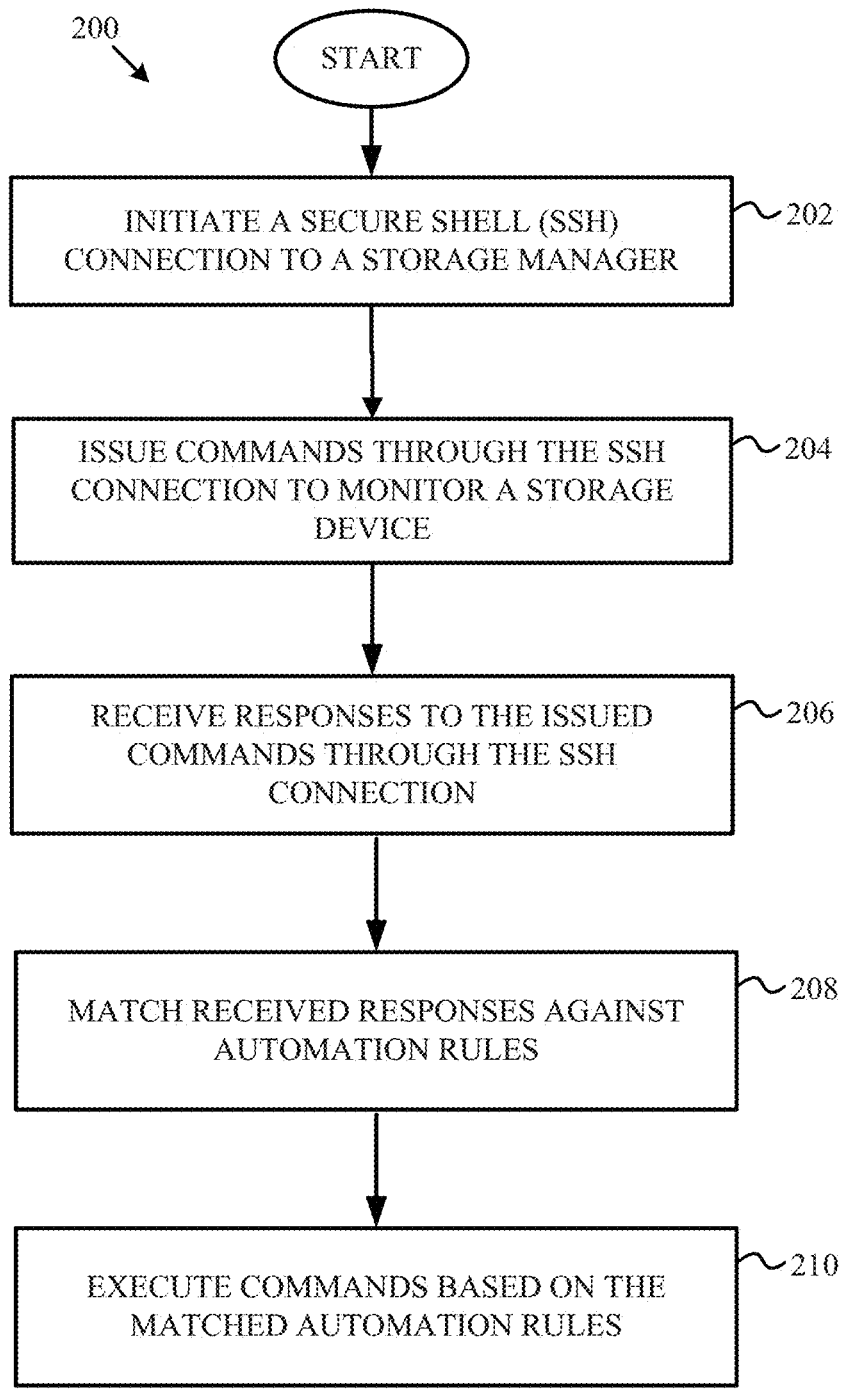
FIG. 2 is a flow chart illustrating a method for monitoring a storage device according to one embodiment of the disclosure.

FIG. 2 is a flow chart illustrating a method for monitoring a storage device according to one embodiment of the disclosure. A method 200 may begin at block 202 with initiating, by a monitoring server, an SSH connection to a storage manager. The method 200 may continue to block 204 with issuing commands, by the monitoring server, through the SSH connection to monitor a storage device coupled to the storage manager. At block 206, the method 200 may continue with receiving, by the monitoring server, responses to the issued commands through the SSH connection. Then, at block 208, the monitoring server may match the responses to automation rules. At block 210, the monitoring server may execute commands based on the matched automation rules. For example, the automation rules may generate alerts to be emailed to an administrator.

Figure 3:
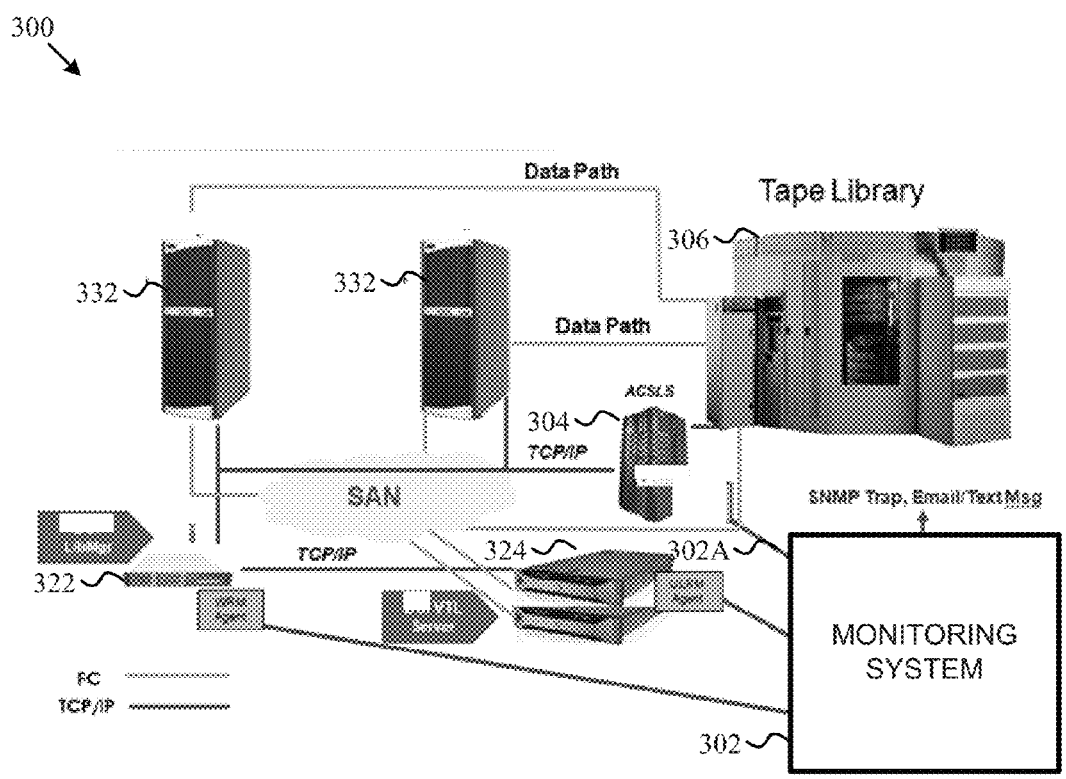
FIG. 3 is a block diagram illustrating a system for monitoring a virtual tape library (VTL) through an SSH connection according to one embodiment of the disclosure.

FIG. 3 is a block diagram illustrating a system for monitoring a virtual tape library (VTL) through an SSH connection according to one embodiment of the disclosure. A system 300 may include a monitoring system 302 in communication with a storage manager 304, such as an automated cartridge system library software (ACSLS). The storage manager 304 may manage and/or monitor a storage device 306, such as a virtual tape library (VTL).

The system 300 may also include other components for monitoring by the monitoring system 302 and/or for reading and writing data to the storage device 302. For example, the monitoring system 302, such as a UNISYS Operations Sentinel (SPO), may monitor a library manager 322 of the storage device 302 and/or a server 324 for managing access to the storage device 302 by client devices 332. The client devices 332 may include, for example, application servers for delivering information to other systems, such as UNISYS OS 2200 or MCP servers.

Monitoring of the storage device 306 by the monitoring system 302 may be performed through a communications connection 302A to the storage manager 304. For example, a secure shell (SSH) session may be initiated by the monitoring system 302 to the storage manager 304. Through the SSH session 302A, commands may be issued to the storage manager 304 to obtain data and/or perform maintenance tasks on the storage device 306. The commands may be, for example, Unix/Linux Resource Monitor (ULRM) commands. The commands may produce output from the storage manager 304 for the following classes of objects: CPU, long-running processes, file system monitoring, memory, critical processes, and/or log file parsing.

The monitoring system 302 may include an automation module 310 for responding to output from the storage manager 304. For example, when data is returned through the communications connection 302A to the monitoring system 302, the data may be matched against automation rules, such as Single Point Autoaction Message System (SP-AMS). The automation rules in automation module 310 may generate alerts when, for example, object states exceed defined thresholds.

Conventional manual monitoring, while a possibility is a costly alternative to the automated monitoring system described above. The automated monitoring may have a very low impact, or footprint, on the system. Automated scaling also allows scaling of the monitoring system to multiple storage devices with limited additional monitoring overhead. Furthermore, the automated system may require limited or no special configuration of the storage manager 304 and/or the storage device 302. For example, no ULRM agent may be required in the storage manager 304. Because the automation engine for monitoring and generating alerts is part of the monitoring system 302, little or no change is needed in the storage device 302 and storage manager 304.

Figure 4:
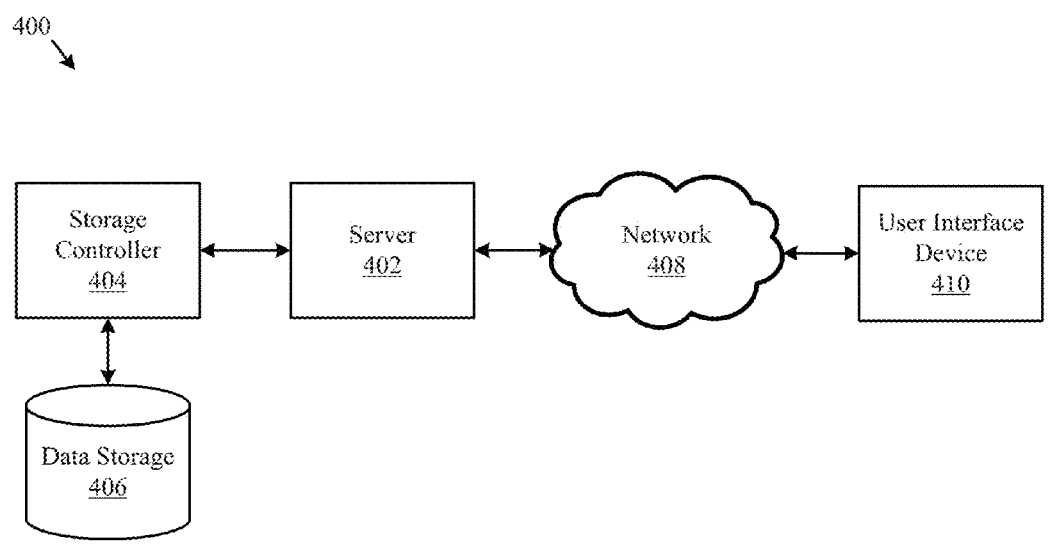
FIG. 4 is a block diagram illustrating a computer network according to one embodiment of the disclosure.

FIG. 4 illustrates one embodiment of a system 400 for an information system, including a system for determining levels of compliance. The system 400 may include a server 402, a data storage device 406, a network 408, and a user interface device 410. In a further embodiment, the system 400 may include a storage controller 404, or storage server configured to manage data communications between the data storage device 406 and the server 402 or other components in communication with the network 408. In an alternative embodiment, the storage controller 404 may be coupled to the network 408.

In one embodiment, the user interface device 410 is referred to broadly and is intended to encompass a suitable processor-based device such as a desktop computer, a laptop computer, a personal digital assistant (PDA) or tablet computer, a smartphone, or other mobile communication device having access to the network 408. In a further embodiment, the user interface device 410 may access the Internet or other wide area or local area network to access a web application or web service hosted by the server 402 and may provide a user interface for receiving information for determining compliance with various principles.

The network 408 may facilitate communications of data between the server 402 and the user interface device 410. The network 408 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 5:
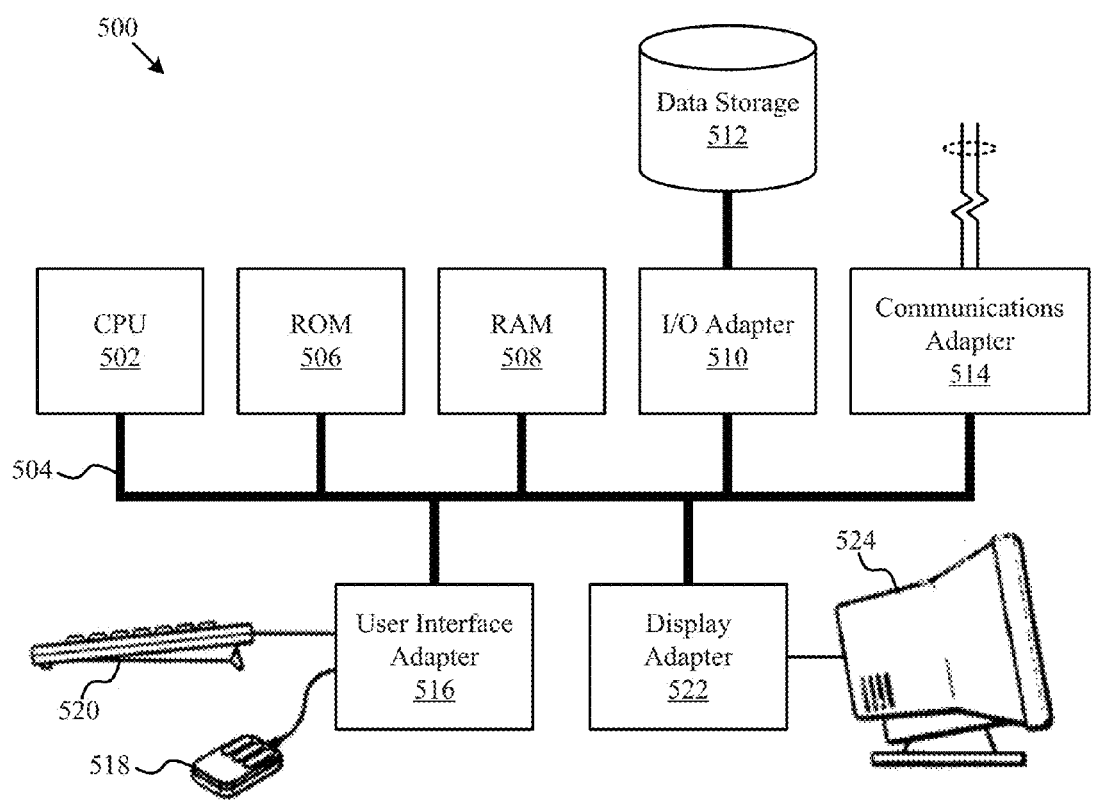
FIG. 5 is a block diagram illustrating a computer system according to one embodiment of the disclosure.

FIG. 5 illustrates a computer system 500 adapted according to certain embodiments of the server 402 and/or the user interface device 410. The central processing unit ("CPU") 502 is coupled to the system bus 504. The CPU 502 may be a general purpose CPU or microprocessor, graphics processing unit ("GPU"), and/or microcontroller. The present embodiments are not restricted by the architecture of the CPU 502 so long as the CPU 502, whether directly or indirectly, supports the operations as described herein. The CPU 502 may execute the various logical instructions according to the present embodiments.

The computer system 500 may also include random access memory (RAM) 508, which may be synchronous RAM (SRAM), dynamic RAM (DRAM), synchronous dynamic RAM (SDRAM), or the like. The computer system 500 may utilize RAM 508 to store the various data structures used by a software application. The computer system 500 may also include read only memory (ROM) 506 which may be PROM, EPROM, EEPROM, optical storage, or the like. The ROM may store configuration information for booting the computer system 500. The RAM 508 and the ROM 506 hold user and system data, and both the RAM 508 and the ROM 506 may be randomly accessed.

The computer system 500 may also include an input/output (I/O) adapter 510, a communications adapter 514, a user interface adapter 516, and a display adapter 522. The I/O adapter 510 and/or the user interface adapter 516 may, in certain embodiments, enable a user to interact with the computer system 500. In a further embodiment, the display adapter 522 may display a graphical user interface (GUI) associated with a software or web-based application on a display device 524, such as a monitor or touch screen.

The I/O adapter 510 may couple one or more storage devices 512, such as one or more of a hard drive, a solid state storage device, a flash drive, a compact disc (CD) drive, a floppy disk drive, and a tape drive, to the computer system 500. According to one embodiment, the data storage 512 may be a separate server coupled to the computer system 500 through a network connection to the I/O adapter 510. The communications adapter 514 may be adapted to couple the computer system 500 to the network 408, which may be one or more of a LAN, WAN, and/or the Internet. The user interface adapter 516 couples user input devices, such as a keyboard 520, a pointing device 518, and/or a touch screen (not shown) to the computer system 500. The keyboard 520 may be an on-screen keyboard displayed on a touch panel. The display adapter 522 may be driven by the CPU 502 to control the display on the display device 524. Any of the devices 502-522 may be physical and/or logical.

The applications of the present disclosure are not limited to the architecture of computer system 500. Rather the computer system 500 is provided as an example of one type of computing device that may be adapted to perform the functions of the server 402 and/or the user interface device 410. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 600 may be virtualized for access by multiple users and/or applications.

If implemented in firmware and/or software, the functions described above, such as described with reference to FIG. 2, may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media. Additionally, the firmware and/or software may be executed by processors integrated with components described above.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computer implemented method utilizing a programmable processor, memory, and a network device, the method, comprising:
    initiating, by a monitoring system, a secure shell (SSH) connection to a storage manager;
    issuing commands, by the monitoring system, through the SSH connection to monitor a storage device coupled to the storage manager;
    receiving, by the monitoring system, responses to the issued commands through the SSH connection, wherein the responses include a running process;

matching, by the monitoring system, the responses to automation rules, wherein the automation rules include a time threshold of the running process for triggering an alert; and executing, by the monitoring system, commands based on the matched automation rules based upon the responses to the issued commands.

2. The computer implemented method of claim 1, wherein the received responses correspond to at least one of: CPU, file system monitoring, memory, critical processes, and log file parsing.

3. The computer implemented method of claim 1, wherein the step of executing commands comprises generating an alert when the received responses indicate the storage device exceeds the storage level threshold.

4. The computer implemented method of claim 1, wherein the step of initiating an SSH connection comprises initiating a secure shell (SSH) connection to a storage manager for a plurality of Virtual Tape Libraries (VTLs).

5. The computer implemented method of claim 1, further comprising monitoring, by the monitoring system, systems coupled to the storage device.

6. The computer implemented method of claim 1, wherein the step of issuing commands comprises issuing Unix/Linux Resource Monitor (ULRM) compliant-commands.

7. A computer program product, comprising:
a non-transitory computer readable medium containing encoded data that when read and executed by a programmable processor causes the processor to implement a method, the method comprising the steps comprising:
initiating a secure shell (SSH) connection to a storage manager;
issuing commands through the SSH connection to monitor a storage device coupled to the storage manager;
receiving responses to the issued commands through the SSH connection, wherein the responses include a running process;
matching the responses to automation rules, wherein the automation rules include a time threshold of the running process for triggering an alert; and
executing commands based on the matched automation rules based upon the responses to the issued commands.

8. The computer program product of claim 7, wherein the received responses correspond to at least one of: CPU, file system monitoring, memory, critical processes, and log file parsing.

9. The computer program product of claim 7, wherein the step of executing commands comprises generating an alert when the received responses indicate the storage device exceeds the storage level threshold.

10. The computer program product of claim 7, wherein the step of initiating an SSH connection to a storage manager for a plurality of Virtual Tape Libraries (VTLs).

11. The computer program product of claim 7, wherein the medium further comprises code to perform the step of monitoring, by the monitoring server, systems coupled to the storage device.

12. The computer program product of claim 7, wherein the step of issuing commands comprises issuing Unix/Linux Resource Monitor (ULRM) compliant-commands.

13. A programmable processing apparatus, comprising:
a memory;
a communications adaptor; and
a processor, wherein the processor is coupled to the memory and to the communications adaptor, and wherein the processor is configured to perform the steps comprising:
initiating a secure shell (SSH) connection, through the communications adaptor, to a storage manager;
issuing commands through the SSH connection to monitor a storage device coupled to the storage manager;
receiving responses to the issued commands through the SSH connection, wherein the responses include a running process;
storing the received responses in the memory;
reading automation rules from the memory;
matching the received responses to automation rules, wherein the automation rules include a time threshold of the running process for triggering an alert; and
executing commands based on the matched automation rules based upon the responses to the issued commands.

14. The programmable processing apparatus of claim 13, wherein the received responses correspond to at least one of: CPU, file system monitoring, memory, critical processes, and log file parsing.

15. The programmable processing apparatus of claim 13, wherein the step of executing commands comprises generating an alert when the received responses indicate the storage device exceeds the storage level threshold.

16. The programmable processing apparatus of claim 13, wherein the step of initiating a SSH connection to a storage manager for a plurality of Virtual Tape Libraries (VTLs).

17. The programmable processing apparatus of claim 13, wherein the processor is further configured to perform the step of monitoring, by the monitoring server, systems coupled to the storage device.

18. The programmable processing apparatus of claim 13, wherein the step of issuing commands comprises issuing Unix/Linux Resource Monitor (ULRM) compliant-commands.

* * * * *